US012750811B2

(12) United States Patent
Kucera

(10) Patent No.: US 12,750,811 B2
(45) Date of Patent: Sep. 29, 2026

(54) UPLINK POSITIONING REFERENCE SIGNAL CONFIGURATION

(71) Applicant: Nokia Technologies Oy, Espoo (FI)

(72) Inventor: Stepan Kucera, Munich (DE)

(73) Assignee: Nokia Technologies Oy, Espoo (FI)

( * ) Notice: Subject to any disclaimer, the term of this patent is extended or adjusted under 35 U.S.C. 154(b) by 246 days.

(21) Appl. No.: 18/724,555

(22) PCT Filed: Dec. 5, 2022

(86) PCT No.: PCT/EP2022/084410
§ 371 (c)(1),
(2) Date: Jun. 26, 2024

(87) PCT Pub. No.: WO2023/131451
PCT Pub. Date: Jul. 13, 2023

(65) Prior Publication Data

US 2025/0168803 A1 May 22, 2025

(30) Foreign Application Priority Data

Jan. 7, 2022 (FI) ...................................... 20225007

(51) Int. Cl.

| | |
|---|---|
| ***H04W 64/00*** | (2009.01) |
| ***H04L 5/00*** | (2006.01) |
| ***H04W 56/00*** | (2009.01) |
| ***H04W 74/0833*** | (2024.01) |
| ***H04W 76/20*** | (2018.01) |

(52) U.S. Cl.
CPC ........... *H04W 64/00* (2013.01); *H04L 5/0051* (2013.01); *H04W 56/0045* (2013.01); *H04W 74/0833* (2013.01); *H04W 76/20* (2018.02)

(58) Field of Classification Search
CPC ............. H04W 64/00; H04W 56/0045; H04W 74/0833; H04W 76/20; H04W 48/20; H04L 5/0051; H04L 5/00; H04L 5/0048
See application file for complete search history.

(56) References Cited

U.S. PATENT DOCUMENTS

| | | | | |
|---|---|---|---|---|
| 9,642,161 | B2 * | 5/2017 | Wu ..................... | H04W 74/006 |
| 10,051,422 | B1 * | 8/2018 | Kumar .................. | H04W 4/023 |
| 11,903,032 | B2 * | 2/2024 | Ozturk .................. | H04W 76/11 |

* cited by examiner

*Primary Examiner* — Kabir A Timory
(74) *Attorney, Agent, or Firm* — Barta Jones, PLLC

(57) ABSTRACT

Disclosed is a method comprising transmitting, by a terminal device, to a network node providing a target cell, a request message requesting an uplink positioning reference signal configuration for uplink positioning reference signal transmission in the target cell, wherein the request message is transmitted in a radio resource control inactive state, while in a source cell; receiving, by the terminal device, from the network node, a message indicative of the uplink positioning reference signal configuration; and transmitting, by the terminal device, one or more uplink positioning reference signal transmissions based at least partly on the uplink positioning reference signal configuration.

20 Claims, 5 Drawing Sheets

UPLINK POSITIONING REFERENCE SIGNAL CONFIGURATION

FIELD

The following exemplary embodiments relate to wireless communication and to positioning.

BACKGROUND

Positioning technologies may be used to estimate a physical location of a device based on uplink positioning reference signals transmitted by the device in a cell. There is a challenge in how to configure the device to transmit uplink positioning reference signals, when the device moves to a different cell.

SUMMARY

The scope of protection sought for various exemplary embodiments is set out by the claims. The exemplary embodiments and features, if any, described in this specification that do not fall under the scope of the claims are to be interpreted as examples useful for understanding various exemplary embodiments.

As a first aspect, there is provided an apparatus comprising at least one processor, and at least one memory including computer program code, wherein the at least one memory and the computer program code are configured, with the at least one processor, to cause the apparatus to: transmit, to a network node providing a target cell, a request message requesting an uplink positioning reference signal configuration for uplink positioning reference signal transmission in the target cell, wherein the request message is transmitted in a radio resource control inactive state, while in a source cell; receive, from the network node, a message indicative of the uplink positioning reference signal configuration; and transmit one or more uplink positioning reference signal transmissions based at least partly on the uplink positioning reference signal configuration.

As a second aspect, there is provided an apparatus comprising means for: transmitting, to a network node providing a target cell, a request message requesting an uplink positioning reference signal configuration for uplink positioning reference signal transmission in the target cell, wherein the request message is transmitted in a radio resource control inactive state, while in a source cell; receiving, from the network node, a message indicative of the uplink positioning reference signal configuration; and transmitting one or more uplink positioning reference signal transmissions based at least partly on the uplink positioning reference signal configuration.

As a third aspect, there is provided an apparatus according to the second aspect, wherein the request message is transmitted using a small data transmission.

As a fourth aspect, there is provided an apparatus according to any of the second or third aspects, wherein the message indicative of the uplink positioning reference signal configuration is received, while in the source cell.

As a fifth aspect, there is provided an apparatus according to any of the second to fourth aspects, wherein the apparatus further comprises means for: activating the uplink positioning reference signal configuration based on an activation command from the network node, wherein the one or more uplink positioning reference signal transmissions are transmitted according to the activated uplink positioning reference signal configuration.

As a sixth aspect, there is provided an apparatus according to the fifth aspect, wherein the apparatus further comprises means for: receiving, from the network node, the activation command while in the target cell.

As a seventh aspect, there is provided an apparatus according to the sixth aspect, wherein the activation command is received, while at an edge area between the source cell and the target cell.

As an eighth aspect, there is provided an apparatus according to any of the second to seventh aspects, wherein the apparatus further comprises means for: transmitting, to the network node, an activation request for activating the uplink positioning reference signal configuration, wherein the activation request is transmitted based on target cell entry.

As a ninth aspect, there is provided an apparatus according to any of the second to eighth aspects, wherein the message indicative of the uplink positioning reference signal configuration further indicates delayed activation of the uplink positioning reference signal configuration.

As a tenth aspect, there is provided an apparatus according to any of the second to ninth aspects, wherein the message indicative of the uplink positioning reference signal configuration further indicates one or more conditions for activating the uplink positioning reference signal configuration, wherein the apparatus further comprises means for: activating the uplink positioning reference signal configuration based at least partly on the one or more conditions.

As an eleventh aspect, there is provided an apparatus according to any of the second to tenth aspects, wherein the apparatus further comprises means for: receiving a timing advance value from the network node, wherein the one or more uplink positioning reference signal transmissions are transmitted based on the uplink positioning reference signal configuration and the timing advance value received from the network node.

As a twelfth aspect, there is provided an apparatus according to any of the second to eleventh aspects, wherein the uplink positioning reference signal configuration received from the network node corresponds to an uplink positioning reference signal configuration of the source cell, and wherein the uplink positioning reference signal configuration received from the network node is applied with a different timing advance than a timing advance applied with the uplink positioning reference signal configuration of the source cell.

As a thirteenth aspect, there is provided a method comprising: transmitting, by a terminal device, to a network node providing a target cell, a request message requesting an uplink positioning reference signal configuration for uplink positioning reference signal transmission in the target cell, wherein the request message is transmitted in a radio resource control inactive state, while in a source cell; receiving, by the terminal device, from the network node, a message indicative of the uplink positioning reference signal configuration; and transmitting, by the terminal device, one or more uplink positioning reference signal transmissions based at least partly on the uplink positioning reference signal configuration.

As a fourteenth aspect, there is provided a method according to the thirteenth aspect, wherein the request message is transmitted using a small data transmission.

As a fifteenth aspect, there is provided a method according to any of the thirteenth or fourteenth aspects, wherein the message indicative of the uplink positioning reference signal configuration is received, while in the source cell.

As a sixteenth aspect, there is provided a method according to any of the thirteenth to fifteenth aspects, wherein the method further comprises: activating, by the terminal device, the uplink positioning reference signal configuration based on an activation command from the network node, wherein the one or more uplink positioning reference signal transmissions are transmitted according to the activated uplink positioning reference signal configuration.

As a seventeenth aspect, there is provided a method according to the sixteenth aspect, wherein the method further comprises: receiving, by the terminal device, from the network node, the activation command while in the target cell.

As an eighteenth aspect, there is provided a method according to the seventeenth aspect, wherein the activation command is received, while at an edge area between the source cell and the target cell.

As a nineteenth aspect, there is provided a method according to any of the thirteenth to eighteenth aspects, wherein the method further comprises: transmitting, by the terminal device, to the network node, an activation request for activating the uplink positioning reference signal configuration, wherein the activation request is transmitted based on target cell entry.

As a twentieth aspect, there is provided a method according to any of the thirteenth to nineteenth aspects, wherein the message indicative of the uplink positioning reference signal configuration further indicates delayed activation of the uplink positioning reference signal configuration.

As a twenty-first aspect, there is provided a method according to any of the thirteenth to twentieth aspects, wherein the message indicative of the uplink positioning reference signal configuration further indicates one or more conditions for activating the uplink positioning reference signal configuration, wherein the method further comprises: activating the uplink positioning reference signal configuration based at least partly on the one or more conditions.

As a twenty-second aspect, there is provided a method according to any of the thirteenth to twenty-first aspects, wherein the method further comprises: receiving a timing advance value from the network node, wherein the one or more uplink positioning reference signal transmissions are transmitted based on the uplink positioning reference signal configuration and the timing advance value received from the network node.

As a twenty-third aspect, there is provided a method according to any of the thirteenth to twenty-second aspects, wherein the uplink positioning reference signal configuration received from the network node corresponds to an uplink positioning reference signal configuration of the source cell, and wherein the uplink positioning reference signal configuration received from the network node is applied with a different timing advance than a timing advance applied with the uplink positioning reference signal configuration of the source cell.

As a twenty-fourth aspect, there is provided a computer program product comprising program instructions which, when run on a computing apparatus, cause the computing apparatus to perform at least the following: transmitting, to a network node providing a target cell, a request message requesting an uplink positioning reference signal configuration for uplink positioning reference signal transmission in the target cell, wherein the request message is transmitted in a radio resource control inactive state, while in a source cell; receiving, from the network node, a message indicative of the uplink positioning reference signal configuration; and transmitting one or more uplink positioning reference signal transmissions based at least partly on the uplink positioning reference signal configuration.

As a twenty-fifth aspect, there is provided a computer program comprising instructions for causing an apparatus to perform at least the following: transmitting, to a network node providing a target cell, a request message requesting an uplink positioning reference signal configuration for uplink positioning reference signal transmission in the target cell, wherein the request message is transmitted in a radio resource control inactive state, while in a source cell; receiving, from the network node, a message indicative of the uplink positioning reference signal configuration; and transmitting one or more uplink positioning reference signal transmissions based at least partly on the uplink positioning reference signal configuration.

As a twenty-sixth aspect, there is provided a computer readable medium comprising program instructions for causing an apparatus to perform at least the following: transmitting, to a network node providing a target cell, a request message requesting an uplink positioning reference signal configuration for uplink positioning reference signal transmission in the target cell, wherein the request message is transmitted in a radio resource control inactive state, while in a source cell; receiving, from the network node, a message indicative of the uplink positioning reference signal configuration; and transmitting one or more uplink positioning reference signal transmissions based at least partly on the uplink positioning reference signal configuration.

As a twenty-seventh aspect, there is provided a non-transitory computer readable medium comprising program instructions for causing an apparatus to perform at least the following: transmitting, to a network node providing a target cell, a request message requesting an uplink positioning reference signal configuration for uplink positioning reference signal transmission in the target cell, wherein the request message is transmitted in a radio resource control inactive state, while in a source cell; receiving, from the network node, a message indicative of the uplink positioning reference signal configuration; and transmitting one or more uplink positioning reference signal transmissions based at least partly on the uplink positioning reference signal configuration.

As a twenty-eighth aspect, there is provided an apparatus comprising at least one processor, and at least one memory including computer program code, wherein the at least one memory and the computer program code are configured, with the at least one processor, to cause the apparatus to: receive, from a terminal device, a request message requesting an uplink positioning reference signal configuration for uplink positioning reference signal transmission in a target cell provided by the apparatus, wherein the request message is received while the terminal device is in a radio resource control inactive state in a source cell; transmit, to the terminal device, a message indicative of the uplink positioning reference signal configuration; and receive, from the terminal device, one or more uplink positioning reference signal transmissions based at least partly on the uplink positioning reference signal configuration.

As a twenty-ninth aspect, there is provided an apparatus comprising means for: receiving, from a terminal device, a request message requesting an uplink positioning reference signal configuration for uplink positioning reference signal transmission in a target cell provided by the apparatus, wherein the request message is received while the terminal device is in a radio resource control inactive state in a source cell; transmitting, to the terminal device, a message indicative of the uplink positioning reference signal configuration;

and receiving, from the terminal device, one or more uplink positioning reference signal transmissions based at least partly on the uplink positioning reference signal configuration.

As a thirtieth aspect, there is provided an apparatus according to the twenty-ninth aspect, wherein the apparatus further comprises means for: transmitting, to the terminal device, an activation command for activating the uplink positioning reference signal configuration.

As a thirty-first aspect, there is provided an apparatus according to the thirtieth aspect, wherein the apparatus further comprises means for: monitoring one or more transmissions from the terminal device, wherein the activation command is transmitted, while the terminal device is in the target cell based on the monitoring.

As a thirty-second aspect, there is provided a method comprising: receiving, by a network node, from a terminal device, a request message requesting an uplink positioning reference signal configuration for uplink positioning reference signal transmission in a target cell provided by the apparatus, wherein the request message is received while the terminal device is in a radio resource control inactive state in a source cell; transmitting, by the network node, to the terminal device, a message indicative of the uplink positioning reference signal configuration; and receiving, by the network node, from the terminal device, one or more uplink positioning reference signal transmissions based at least partly on the uplink positioning reference signal configuration.

As a thirty-third aspect, there is provided a method according to the thirty-second aspect, wherein the method further comprises: transmitting, by the network node, to the terminal device, an activation command for activating the uplink positioning reference signal configuration.

As a thirty-fourth aspect, there is provided a method according to the thirty-third aspect, wherein the method further comprises: monitoring, by the network node, one or more transmissions from the terminal device, wherein the activation command is transmitted, while the terminal device is in the target cell based on the monitoring.

As a thirty-fifth aspect, there is provided a computer program comprising instructions for causing an apparatus to perform at least the following: receiving, from a terminal device, a request message requesting an uplink positioning reference signal configuration for uplink positioning reference signal transmission in a target cell provided by the apparatus, wherein the request message is received while the terminal device is in a radio resource control inactive state in a source cell; transmitting, to the terminal device, a message indicative of the uplink positioning reference signal configuration; and receiving, from the terminal device, one or more uplink positioning reference signal transmissions based at least partly on the uplink positioning reference signal configuration.

As a thirty-sixth aspect, there is provided a computer program product comprising program instructions which, when run on a computing apparatus, cause the computing apparatus to perform at least the following: receiving, from a terminal device, a request message requesting an uplink positioning reference signal configuration for uplink positioning reference signal transmission in a target cell provided by the apparatus, wherein the request message is received while the terminal device is in a radio resource control inactive state in a source cell; transmitting, to the terminal device, a message indicative of the uplink positioning reference signal configuration; and receiving, from the terminal device, one or more uplink positioning reference signal transmissions based at least partly on the uplink positioning reference signal configuration.

As a thirty-seventh aspect, there is provided a computer readable medium comprising program instructions for causing an apparatus to perform at least the following: receiving, from a terminal device, a request message requesting an uplink positioning reference signal configuration for uplink positioning reference signal transmission in a target cell provided by the apparatus, wherein the request message is received while the terminal device is in a radio resource control inactive state in a source cell; transmitting, to the terminal device, a message indicative of the uplink positioning reference signal configuration; and receiving, from the terminal device, one or more uplink positioning reference signal transmissions based at least partly on the uplink positioning reference signal configuration.

As a thirty-eighth aspect, there is provided a non-transitory computer readable medium comprising program instructions for causing an apparatus to perform at least the following: receiving, from a terminal device, a request message requesting an uplink positioning reference signal configuration for uplink positioning reference signal transmission in a target cell provided by the apparatus, wherein the request message is received while the terminal device is in a radio resource control inactive state in a source cell; transmitting, to the terminal device, a message indicative of the uplink positioning reference signal configuration; and receiving, from the terminal device, one or more uplink positioning reference signal transmissions based at least partly on the uplink positioning reference signal configuration.

As a thirty-ninth aspect, there is provided a system comprising at least a terminal device and a network node providing a target cell. The terminal device is configured to: transmit, to the network node, a request message requesting an uplink positioning reference signal configuration for uplink positioning reference signal transmission in the target cell, wherein the request message is transmitted in a radio resource control inactive state, while in a source cell; receive, from the network node, a message indicative of the uplink positioning reference signal configuration; and transmit one or more uplink positioning reference signal transmissions based at least partly on the uplink positioning reference signal configuration. The network node is configured to: receive, from the terminal device, the request message requesting the uplink positioning reference signal configuration for uplink positioning reference signal transmission in the target cell; transmit, to the terminal device, the message indicative of the uplink positioning reference signal configuration; and receive, from the terminal device, the one or more uplink positioning reference signal transmissions.

As a fortieth aspect, there is provided a system comprising at least a terminal device and a network node providing a target cell. The terminal device comprises means for: transmitting, to the network node, a request message requesting an uplink positioning reference signal configuration for uplink positioning reference signal transmission in the target cell, wherein the request message is transmitted in a radio resource control inactive state, while in a source cell; receiving, from the network node, a message indicative of the uplink positioning reference signal configuration; and transmitting one or more uplink positioning reference signal transmissions based at least partly on the uplink positioning reference signal configuration. The network node comprises means for: receiving, from the terminal device, the request message requesting the uplink positioning reference signal configuration for uplink positioning reference signal transmission in the target cell; transmitting, to the terminal device, the message indicative of the uplink positioning reference signal configuration; and receiving, from the terminal device, the one or more uplink positioning reference signal transmissions.

BRIEF DESCRIPTION OF THE DRAWINGS

In the following, various exemplary embodiments will be described in greater detail with reference to the accompanying drawings, in which.

DETAILED DESCRIPTION

The following embodiments are exemplifying. Although the specification may refer to "an", "one", or "some" embodiment(s) in several locations of the text, this does not necessarily mean that each reference is made to the same embodiment(s), or that a particular feature only applies to a single embodiment. Single features of different embodiments may also be combined to provide other embodiments.

In the following, different exemplary embodiments will be described using, as an example of an access architecture to which the exemplary embodiments may be applied, a radio access architecture based on long term evolution advanced (LTE Advanced, LTE-A), new radio (NR, 5G), or beyond 5G, without restricting the exemplary embodiments to such an architecture, however. It is obvious for a person skilled in the art that the exemplary embodiments may also be applied to other kinds of communications networks having suitable means by adjusting parameters and procedures appropriately. Some examples of other options for suitable systems may be the universal mobile telecommunications system (UMTS) radio access network (UTRAN or E-UTRAN), long term evolution (LTE, substantially the same as E-UTRA), wireless local area network (WLAN or Wi-Fi), worldwide interoperability for microwave access (WiMAX), Bluetooth®, personal communications services (PCS), ZigBee®, wideband code division multiple access (WCDMA), systems using ultra-wideband (UWB) technology, sensor networks, mobile ad-hoc networks (MANETs) and Internet Protocol multimedia subsystems (IMS) or any combination thereof.

Figure 1:
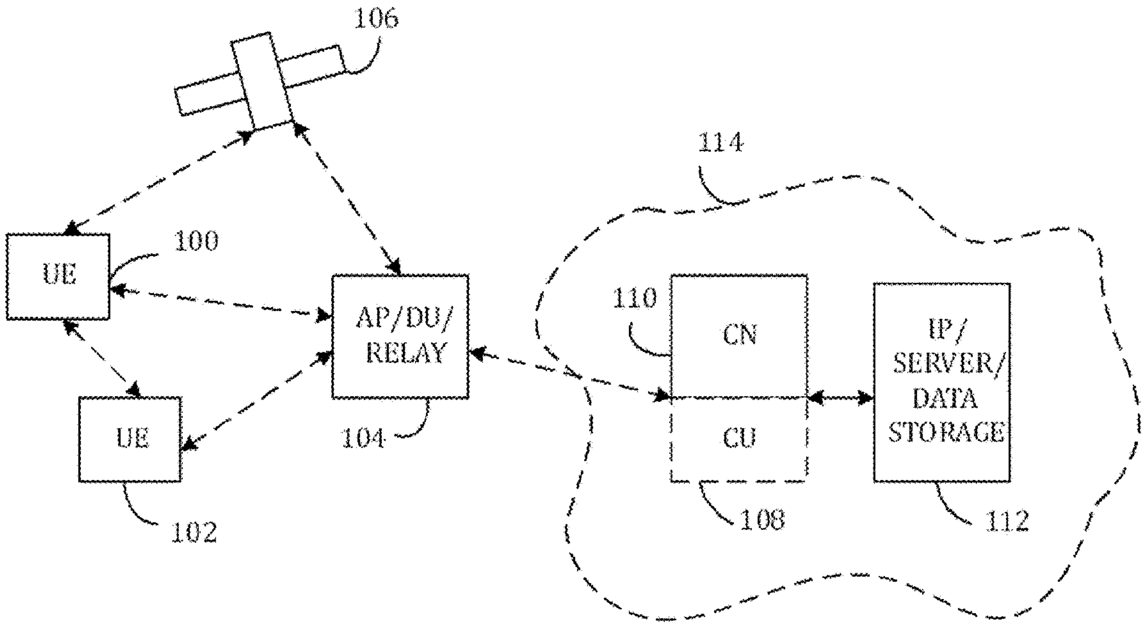
FIG. 1 illustrates an exemplary embodiment of a cellular communication network.

FIG. 1 depicts examples of simplified system architectures showing some elements and functional entities, all being logical units, whose implementation may differ from what is shown. The connections shown in FIG. 1 are logical connections; the actual physical connections may be different. It is apparent to a person skilled in the art that the system may also comprise other functions and structures than those shown in FIG. 1.

The exemplary embodiments are not, however, restricted to the system given as an example but a person skilled in the art may apply the solution to other communication systems provided with necessary properties.

The example of FIG. 1 shows a part of an exemplifying radio access network.

FIG. 1 shows user devices 100 and 102 configured to be in a wireless connection on one or more communication channels in a cell with an access node (such as (e/g) NodeB) 104 providing the cell. The physical link from a user device to a (e/g) NodeB may be called uplink or reverse link and the physical link from the (e/g) NodeB to the user device may be called downlink or forward link. It should be appreciated that (e/g) NodeBs or their functionalities may be implemented by using any node, host, server or access point etc. entity suitable for such a usage.

A communication system may comprise more than one (e/g) NodeB, in which case the (e/g) NodeBs may also be configured to communicate with one another over links, wired or wireless, designed for the purpose. These links may be used for signaling purposes. The (e/g) NodeB may be a computing device configured to control the radio resources of communication system it is coupled to. The (e/g) NodeB may also be referred to as a base station, an access point or any other type of interfacing device including a relay station capable of operating in a wireless environment. The (e/g) NodeB may include or be coupled to transceivers. From the transceivers of the (e/g) NodeB, a connection may be provided to an antenna unit that establishes bi-directional radio links to user devices. The antenna unit may comprise a plurality of antennas or antenna elements. The (e/g) NodeB may further be connected to core network 110 (CN or next generation core NGC). Depending on the system, the counterpart on the CN side may be a serving gateway (S-GW, routing and forwarding user data packets), packet data network gateway (P-GW) for providing connectivity of user devices (UEs) to external packet data networks, mobility management entity (MME), access and mobility management function (AMF), or location management function (LMF), etc.

The user device (also called UE, user equipment, user terminal, terminal device, etc.) illustrates one type of an apparatus to which resources on the air interface may be allocated and assigned, and thus any feature described herein with a user device may be implemented with a corresponding apparatus, such as a relay node. An example of such a relay node may be a layer 3 relay (self-backhauling relay) towards the base station. The self-backhauling relay node may also be called an integrated access and backhaul (IAB) node. The IAB node may comprise two logical parts: a mobile termination (MT) part, which takes care of the backhaul link(s) (i.e., link(s) between IAB node and a donor node, also known as a parent node) and a distributed unit (DU) part, which takes care of the access link(s), i.e., child link(s) between the IAB node and UE(s), and/or between the IAB node and other IAB nodes (multi-hop scenario).

The user device may refer to a portable computing device that includes wireless mobile communication devices operating with or without a subscriber identification module (SIM), including, but not limited to, the following types of devices: a mobile station (mobile phone), smartphone, personal digital assistant (PDA), handset, device using a wireless modem (alarm or measurement device, etc.), laptop and/or touch screen computer, tablet, game console, notebook, and multimedia device. It should be appreciated that a user device may also be a nearly exclusive uplink only device, of which an example may be a camera or video camera loading images or video clips to a network. A user device may also be a device having capability to operate in Internet of Things (IoT) network which is a scenario in which objects may be provided with the ability to transfer data over a network without requiring human-to-human or human-to-computer interaction. The user device may also utilize cloud. In some applications, a user device may comprise a small portable device with radio parts (such as a watch, earphones or eyeglasses) and the computation may be carried out in the cloud. The user device (or in some exemplary embodiments a layer 3 relay node) may be configured to perform one or more of user equipment functionalities. The user device may also be called a subscriber unit, mobile station, remote terminal, access terminal, user terminal, terminal device, or user equipment (UE) just to mention but a few names or apparatuses.

Various techniques described herein may also be applied to a cyber-physical system (CPS) (a system of collaborating computational elements controlling physical entities). CPS may enable the implementation and exploitation of massive amounts of interconnected ICT devices (sensors, actuators, processors microcontrollers, etc.) embedded in physical objects at different locations. Mobile cyber physical systems, in which the physical system in question may have inherent mobility, are a subcategory of cyber-physical systems. Examples of mobile physical systems include mobile robotics and electronics transported by humans or animals.

Additionally, although the apparatuses have been depicted as single entities, different units, processors and/or memory units (not all shown in FIG. 1) may be implemented.

5G enables using multiple input-multiple output (MIMO) antennas, many more base stations or nodes than the LTE (a so-called small cell concept), including macro sites operating in co-operation with smaller stations and employing a variety of radio technologies depending on service needs, use cases and/or spectrum available. 5G mobile communications may support a wide range of use cases and related applications including video streaming, augmented reality, different ways of data sharing and various forms of machine type applications (such as (massive) machine-type communications (mMTC), including vehicular safety, different sensors and real-time control. 5G may be expected to have multiple radio interfaces, namely below 6 GHz, cmWave and mmWave, and also being integrable with existing legacy radio access technologies, such as the LTE. Integration with the LTE may be implemented, at least in the early phase, as a system, where macro coverage may be provided by the LTE, and 5G radio interface access may come from small cells by aggregation to the LTE. In other words, 5G may support both inter-RAT operability (such as LTE-5G) and inter-RI operability (inter-radio interface operability, such as below 6 GHz-cmWave, below 6 GHz-cmWave-mmWave). One of the concepts considered to be used in 5G networks may be network slicing in which multiple independent and dedicated virtual sub-networks (network instances) may be created within the substantially same infrastructure to run services that have different requirements on latency, reliability, throughput and mobility.

The current architecture in LTE networks may be fully distributed in the radio and fully centralized in the core network. The low latency applications and services in 5G may need to bring the content close to the radio which leads to local break out and multi-access edge computing (MEC). 5G may enable analytics and knowledge generation to occur at the source of the data. This approach may need leveraging resources that may not be continuously connected to a network such as laptops, smartphones, tablets and sensors. MEC may provide a distributed computing environment for application and service hosting. It may also have the ability to store and process content in close proximity to cellular subscribers for faster response time. Edge computing may cover a wide range of technologies such as wireless sensor networks, mobile data acquisition, mobile signature analysis, cooperative distributed peer-to-peer ad hoc networking and processing also classifiable as local cloud/fog computing and grid/mesh computing, dew computing, mobile edge computing, cloudlet, distributed data storage and retrieval, autonomic self-healing networks, remote cloud services, augmented and virtual reality, data caching, Internet of Things (massive connectivity and/or latency critical), critical communications (autonomous vehicles, traffic safety, real-time analytics, time-critical control, healthcare applications).

The communication system may also be able to communicate with other networks, such as a public switched telephone network or the Internet 112, or utilize services provided by them. The communication network may also be able to support the usage of cloud services, for example at least part of core network operations may be carried out as a cloud service (this is depicted in FIG. 1 by "cloud" 114). The communication system may also comprise a central control entity, or a like, providing facilities for networks of different operators to cooperate for example in spectrum sharing.

Edge cloud may be brought into radio access network (RAN) by utilizing network function virtualization (NFV) and software defined networking (SDN). Using edge cloud may mean access node operations to be carried out, at least partly, in a server, host or node operationally coupled to a remote radio head (RRH) or a radio unit (RU), or a base station comprising radio parts. It may also be possible that node operations will be distributed among a plurality of servers, nodes or hosts. Carrying out the RAN real-time functions at the RAN side (in a distributed unit, DU 104) and non-real time functions in a centralized manner (in a central unit, CU 108) may be enabled for example by application of cloudRAN architecture.

It should also be understood that the distribution of labour between core network operations and base station operations may differ from that of the LTE or even be non-existent. Some other technology advancements that may be used may be Big Data and all-IP, which may change the way networks are being constructed and managed. 5G (or new radio, NR) networks may be designed to support multiple hierarchies, where MEC servers may be placed between the core and the base station or nodeB (gNB). It should be appreciated that MEC may be applied in 4G networks as well.

5G may also utilize non-terrestrial communication, for example satellite communication, to enhance or complement the coverage of 5G service, for example by providing backhauling. Possible use cases may be providing service continuity for machine-to-machine (M2M) or Internet of Things (IoT) devices or for passengers on board of vehicles, or ensuring service availability for critical communications, and future railway/maritime/aeronautical communications. Satellite communication may utilize geostationary earth orbit (GEO) satellite systems, but also low earth orbit (LEO) satellite systems, in particular mega-constellations (systems in which hundreds of (nano) satellites are deployed). At least one satellite 106 in the mega-constellation may cover several satellite-enabled network entities that create on-ground cells. The on-ground cells may be created through an on-ground relay node 104 or by a gNB located on-ground or in a satellite.

It is obvious for a person skilled in the art that the depicted system is only an example of a part of a radio access system and in practice, the system may comprise a plurality of (e/g) NodeBs, the user device may have an access to a plurality of radio cells and the system may also comprise other apparatuses, such as physical layer relay nodes or other network elements, etc. At least one of the (e/g) NodeBs or may be a Home (e/g) nodeB.

Furthermore, the (e/g) nodeB or base station may also be split into: a radio unit (RU) comprising a radio transceiver (TRX), i.e., a transmitter (Tx) and a receiver (Rx); one or more distributed units (DUs) that may be used for the so-called Layer 1 (L1) processing and real-time Layer 2 (L2) processing; and a central unit (CU) (also known as a centralized unit) that may be used for non-real-time L2 and Layer 3 (L3) processing. The CU may be connected to the one or more DUs for example by using an F1 interface. Such a split may enable the centralization of CUs relative to the cell sites and DUs, whereas DUs may be more distributed and may even remain at cell sites. The CU and DU together may also be referred to as baseband or a baseband unit (BBU). The CU and DU may also be comprised in a radio access point (RAP).

The CU may be defined as a logical node hosting higher layer protocols, such as radio resource control (RRC), service data adaptation protocol (SDAP) and/or packet data convergence protocol (PDCP), of the (e/g) nodeB or base station. The DU may be defined as a logical node hosting radio link control (RLC), medium access control (MAC) and/or physical (PHY) layers of the (e/g) nodeB or base station. The operation of the DU may be at least partly controlled by the CU. The CU may comprise a control plane (CU-CP), which may be defined as a logical node hosting the RRC and the control plane part of the PDCP protocol of the CU for the (e/g) nodeB or base station. The CU may further comprise a user plane (CU-UP), which may be defined as a logical node hosting the user plane part of the PDCP protocol and the SDAP protocol of the CU for the (e/g) nodeB or base station.

Cloud computing platforms may also be used to run the CU and/or DU. The CU may run in a cloud computing platform, which may be referred to as a virtualized CU (vCU). In addition to the vCU, there may also be a virtualized DU (vDU) running in a cloud computing platform. Furthermore, there may also be a combination, where the DU may use so-called bare metal solutions, for example application-specific integrated circuit (ASIC) or customer-specific standard product (CSSP) system-on-a-chip (SoC) solutions. It should also be understood that the distribution of labour between the above-mentioned base station units, or different core network operations and base station operations, may differ.

Additionally, in a geographical area of a radio communication system, a plurality of different kinds of radio cells as well as a plurality of radio cells may be provided. Radio cells may be macro cells (or umbrella cells) which may be large cells having a diameter of up to tens of kilometers, or smaller cells such as micro-, femto- or picocells. The (e/g) NodeBs of FIG. 1 may provide any kind of these cells. A cellular radio system may be implemented as a multilayer network including several kinds of cells. In multilayer networks, one access node may provide one kind of a cell or cells, and thus a plurality of (e/g) NodeBs may be needed to provide such a network structure.

For fulfilling the need for improving the deployment and performance of communication systems, the concept of "plug-and-play" (e/g) NodeBs may be introduced. A network which may be able to use "plug-and-play" (e/g) NodeBs, may include, in addition to Home (e/g) NodeBs (H (e/g) nodeBs), a home node B gateway, or HNB-GW (not shown in FIG. 1). A HNB Gateway (HNB-GW), which may be installed within an operator's network, may aggregate traffic from a large number of HNBs back to a core network.

Positioning techniques may be used to estimate a physical location of a UE. For example, the following positioning techniques may be used in NR: downlink time difference of arrival (DL-TDoA), uplink time difference of arrival (UL-TDoA), downlink angle of departure (DL-AoD), uplink angle of arrival (UL-AoA), and/or multi-cell round trip time (multi-RTT).

The positioning of the UE may be based on a downlink positioning reference signal (DL PRS) transmitted from the network to the UE, and/or an uplink positioning reference signal (UL PRS) transmitted from the UE to the network. The sounding reference signal (SRS) is one example of an UL PRS, although SRS may also be used for other purposes than positioning.

In order to reduce signaling overhead from connection establishment and to minimize power consumption, in 5G and beyond, UEs may be enabled to transmit a small amount of data in an inactive state (RRC_INACTIVE), using a so-called small data transmission (SDT) procedure (small data transfer procedure). A UE in an inactive state may initiate the small data transmission procedure, if certain criteria are met, for example if the amount of uplink data to be transmitted is smaller than a data amount threshold. Data amount may also be referred to as data volume or data quantity. In other words, using 5G terminology, SDT is a procedure allowing data transmission while remaining in RRC_INACTIVE state (i.e., without transitioning to RRC_CONNECTED state). Thus, the SDT procedure may avoid the signaling overhead and delay associated with transitioning from RRC_INACTIVE state to RRC_CONNECTED state. SDT may be enabled on a radio bearer basis and initiated by the UE, if less than a configured amount of uplink (UL) data awaits transmission across the radio bearers for which SDT is enabled, measured reference signal received power (RSRP) in the cell is above a configured threshold, and a valid resource for SDT transmission is available.

RRC_INACTIVE is a state, wherein a UE remains in CM-CONNECTED state and can move within an area configured by the RAN without notifying the RAN. CM is an abbreviation for connection management. In the RRC_INACTIVE state, the last serving gNB keeps the UE context and the UE-associated connection with the serving access and mobility management function (AMF) and user plane function (UPF). The RRC_INACTIVE state may be used to reduce UE power consumption by alleviating the control plane (CP) procedures required at the RRC state change and associated latency. When a UE is in RRC_INACTIVE state, the radio connection is suspended, while the core network connectivity is maintained active (i.e., the UE remains in CM-CONNECTED state). A UE access stratum (AS) context (referred to as UE Inactive AS context) is stored at both the UE and RAN sides for quickly resuming a suspended connection, including the latest radio bearer configuration used for the data/signaling transmission, as well as the security keys and algorithms for integrity protection and ciphering in the radio interface. Based on this retained information, the UE can resume the radio connection with a much lower delay and associated signaling overhead, when compared to a UE in RRC_IDLE state that needs to establish a new connection to both the radio and core network.

The following three issues may need to be addressed for positioning in RRC_INACTIVE state:

1) Triggering of uplink positioning in RRC_INACTIVE: given that small data transmission is a mobile-originated procedure in NR Rel-17, the use of uplink positioning (when allowed/configured by the network) may need to be triggered by the UE.

2) Configuration, activation, and deactivation of UL PRS in RRC_INACTIVE state.

3) Event reporting in RRC_INACTIVE.

Thus, there is a challenge in how to update the UL PRS configuration, when an RRC_INACTIVE UE migrates from a source cell to a target cell.

In order to address the above issues, some exemplary embodiments provide a method for efficient UL PRS configuration in mobile RRC_INACTIVE UEs (i.e., moving UEs that are in RRC_INACTIVE state). This method enables to dynamically re-configure UL PRS directly in RRC_INACTIVE UEs (i.e., without RRC re-activation) with a valid UL PRS configuration (e.g., up-to-date timing advance to the target cell), immediately (or almost immediately) after the migration from the source cell to the target cell, and in full compliance with existing 3GPP specifications.

Some exemplary embodiments are based on exploiting the following two observations. The first observation is that a small data transmission (SDT) in RRC_INACTIVE state can be accepted by any gNB in the same radio notification area (RNA). In other words, an RRC_INACTIVE UE can establish a communication channel also with one or more neighboring gNBs of the cell that the UE is currently camping on. The second observation is that, while gNBs may not be able to track RRC_INACTIVE UEs (except when the UE crosses RNA boundaries), the target gNB may accurately detect the migration of an RRC_INACTIVE UE from a source cell into its coverage by monitoring the UL PRS broadcasted by the UE.

Figure 2:
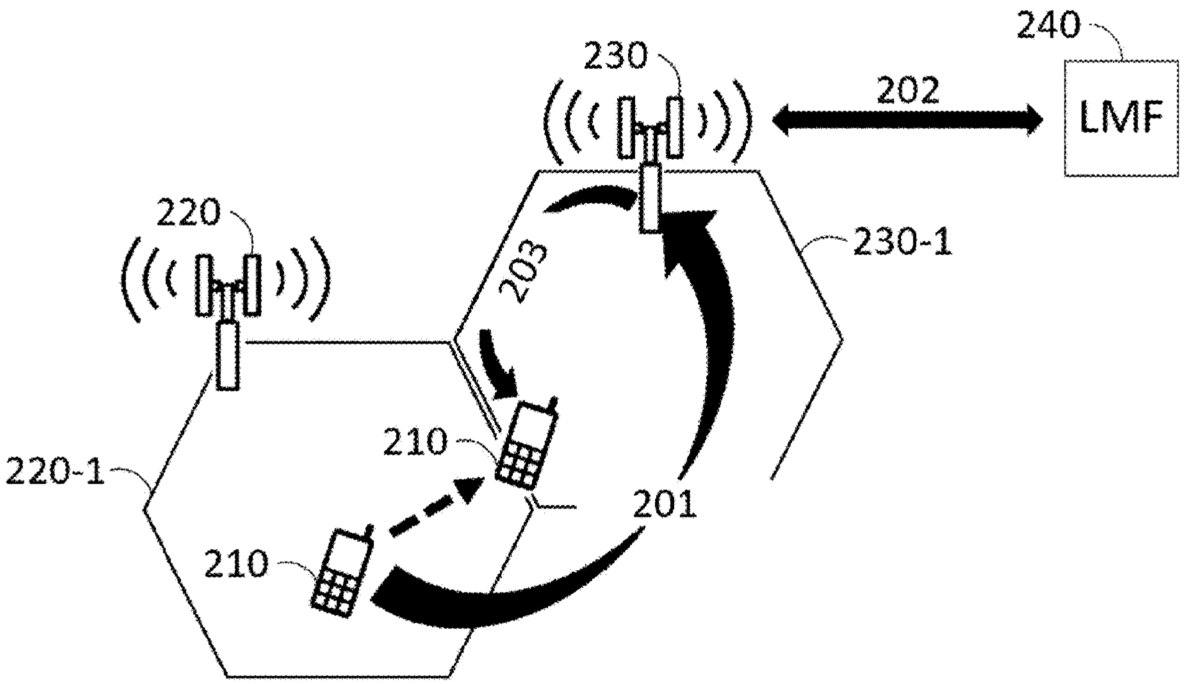
FIG. 2 illustrates a system according to an exemplary embodiment.

FIG. 2 illustrates a system according to an exemplary embodiment. Referring to FIG. 2, the system comprises a mobile RRC_INACTIVE UE 210 (i.e., a moving UE that is in RRC_INACTIVE state), a source gNB 220 providing a source cell 220-1, a target gNB 230 providing a target cell 230-1, and a location management function (LMF) 240. The target cell 230-1 may be a neighbor cell of the source cell 220-1.

The UE 210 proactively requests 201 a new UL PRS configuration from the target gNB 230, while the UE 210 is still in the source cell 220-1 provided by the source gNB 220. In other words, to exploit the first observation regarding the SDT properties, the pre-configuration for new target cell UL PRS may be separated from its activation by letting the UE 210 request 201 the UL PRS configuration via SDT directly from the target cell, while the UE 210 is still in the source cell 220-1.

This enables an efficient offline configuration preparation 202 of the UL PRS before the UE 210 enters the target cell 230-1, i.e., without any strict delay constraints.

When the UE 210 crosses the edge (boundary) of the target cell 230-1 (i.e., enters the target cell) provided by the target gNB 230, the UL PRS configuration may be instantaneously validated and activated 203. To this end, the UL PRS transmission of the UE 210 in the source cell 220-1 may be monitored by the target gNB 230 and/or by the source gNB 220. In other words, to exploit the second observation regarding the UL PRS broadcasted in positioning RRC_INACTIVE UEs, the UL PRS transmission by the UE 210 in the source cell 220-1 may be monitored to accurately determine the moment when the UE 210 crosses the boundary of the target cell 230-1. This event serves as a dynamic and efficiently timed trigger for an instantaneous joint validation and activation 203 of the UL PRS pre-configuration, when there is an actual need for the UL PRS transmission in the target cell 230-1.

In one example, the UL PRS monitoring may be performed directly by the target gNB, as only the target cell may be able to activate the pre-configured UL PRS resources and issue a valid timing advance for the UE. To this end, the target cell may reuse the source cell's UL PRS configuration. It should also be noted that the UL PRS monitoring allows the target gNB to monitor the timing advances for the upcoming pre-configured UL PRS transmission by the UE as well. Additionally or alternatively, the source gNB and/or the UE may complement or control the monitoring process, and act as a trigger for the final validation and activation by the target gNB. For example, the UE may transmit, or trigger, an activation request to the target gNB via SDT, to which the gNB may respond with a validation and activation message (e.g., RRC release message), or the source cell measurements may be compared with the target cell measurements. Likewise, these measurements may be used to cancel the target cell pre-allocation (i.e., the UL PRS configuration of the target cell), for example when the UE changes trajectory and moves towards a different cell.

Figure 3:
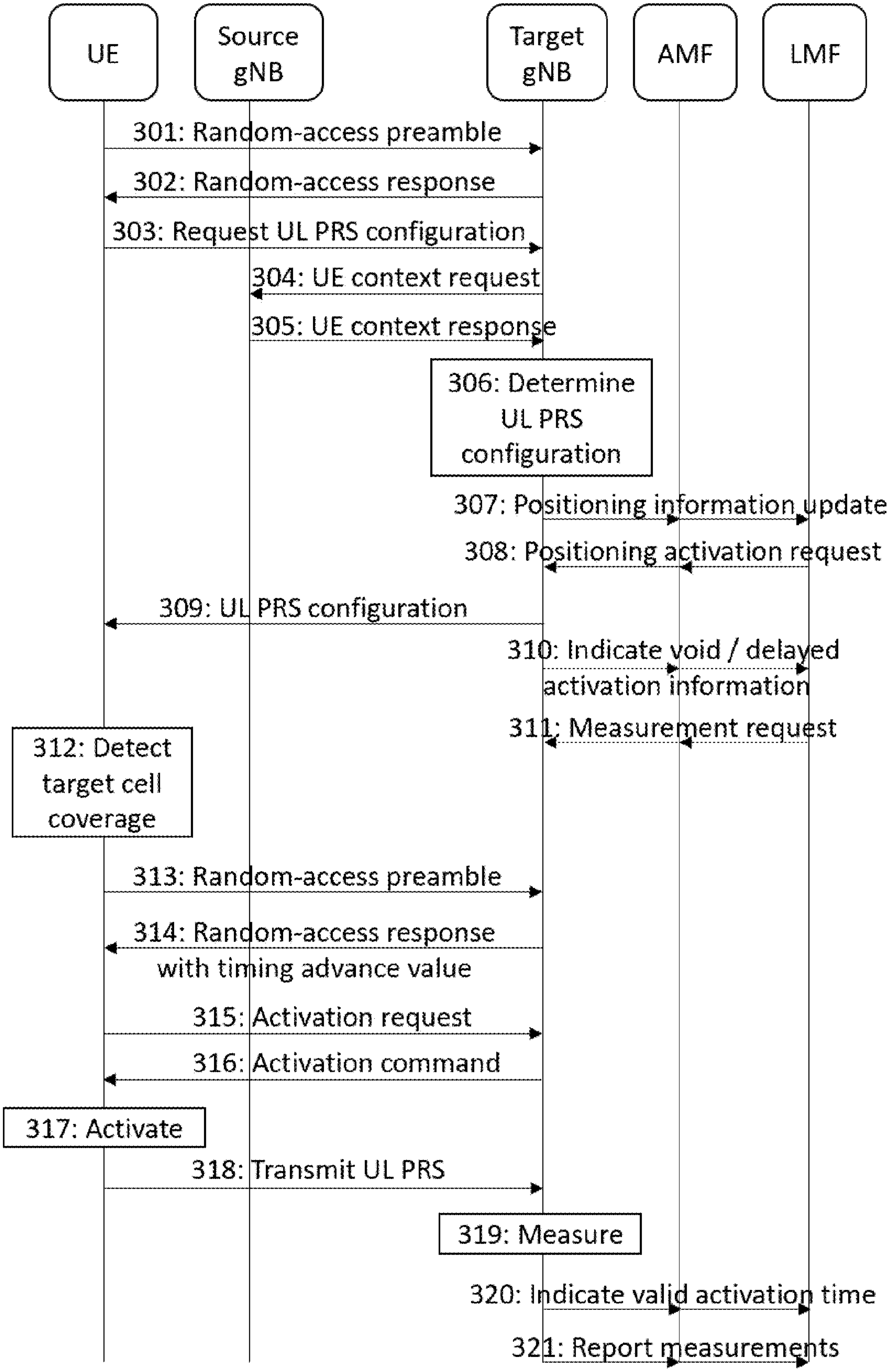
FIGS. 3-4 illustrate signaling diagrams according to some exemplary embodiments.

FIG. 3 illustrates a signaling diagram according to an exemplary embodiment for UE-triggered validation and activation of UL PRS pre-configuration by the target gNB. Herein the target gNB may also be referred to as a network node providing a target cell.

Referring to FIG. 3, in step 301, a UE in RRC_INACTIVE state transmits a random-access preamble to the target gNB providing the target cell, while the UE is still in a source cell provided by a source gNB. For example, the UE may correspond to the UE 210 in FIG. 2, the source gNB may correspond to the source gNB 220 in FIG. 2, and the target gNB may correspond to the target gNB 230 in FIG. 2. The random-access preamble may be transmitted using a small data transmission (SDT) in RRC_INACTIVE state.

In step 302, the target gNB transmits a random-access response to the UE in response to the random-access preamble received in step 301, while the UE is still in the source cell.

In step 303, the UE transmits, to the target gNB, a request message requesting an UL PRS configuration for UL PRS transmission in the target cell. The UE may transmit the request message using a small data transmission in RRC_INACTIVE state, while the UE is still in the source cell. In other words, the UE may not yet be in the target cell, when transmitting the request message. For example, an RRC resume request message may be used as the request message.

In step 304, the target gNB transmits a UE context request to the source gNB (or the last serving gNB of the UE within the RNA).

In step 305, the source gNB (or the last serving gNB within the RNA) transmits a UE context response to the target gNB in response to the UE context request. The UE context response may comprise the UE context and an UL PRS configuration used by the UE in the source cell.

In step 306, the target gNB determines the UL PRS configuration of the target cell for UL PRS transmission by the UE in the target cell. The UL PRS configuration of the target cell may correspond (e.g., be identical) to the UL PRS configuration of the source cell in order to enable efficient resource reuse. Alternatively, the UL PRS configuration of the target cell may be different than the UL PRS configuration of the source cell. However, the UL PRS configuration of the target cell may be applied with a different timing advance than a timing advance applied with the UL PRS configuration of the source cell in both cases (i.e., with corresponding or different UL PRS configuration). In other words, the UL PRS configuration of the target cell may be used with the timing advance of the target cell, whereas the UL PRS configuration of the source cell may be used with the timing advance of the source cell.

In step 307, the target gNB transmits a positioning information update to a location management function (LMF) via an access and mobility management function (AMF) by using new radio positioning protocol A (NRPPa) signaling in order to register the determined UL PRS configuration of the target cell at the LMF.

In step 308, the LMF transmits, in response to the positioning information update, a positioning activation request to the target gNB via the AMF by using NRPPa signaling to activate the determined UL PRS configuration of the target cell.

In step 309, the target gNB transmits, to the UE, a message indicative of the determined UL PRS configuration of the target cell. The UE may receive the message in RRC_INACTIVE state, while the UE is in the source cell. Alternatively, if the UE is moving very fast, the UE may receive the message after it has already moved to the target cell. For example, an RRC release message may be used as the message indicative of the determined UL PRS configuration of the target cell. In other words, the target gNB completes the initial SDT transaction with the UE by transmitting the message indicative of the determined UL PRS configuration of the target cell. However, the UL PRS activation information in the message is either void/omitted (i.e., no scheduling grant) or delayed (e.g., Type 1 configured grant via RRC with substantially deferred start time). For example, the delayed activation information in the message may indicate to activate the UL PRS configuration upon expiration of a timer, or to wait for a separate activation command from the target gNB before activating the UL PRS configuration of the target cell.

Additionally or alternatively, the message indicative of the UL PRS configuration may further indicate one or more conditions for activating the UL PRS configuration. The UE entering the edge of the target cell may be one of the one or more conditions. In other words, the UE may proactively activate the UL PRS configuration upon arriving at the edge between the source cell and the target cell. The edge between the source cell and the target cell may refer to an edge area between the cells. For example, such edge area may mean an area, which is covered by both cells. For example, the edge area may mean a cell edge. Thus, the edge area may refer to e.g. target cell edge. Such edge area may be an edge area for more than one cell, for example for both the target cell and the source cell.

The message indicative of the UL PRS configuration of the target cell may be transmitted after a delay between the request message and the message indicative of the UL PRS configuration. In other words, there may be a delay between steps 303 and 309. For example, the message indicative of the UL PRS configuration may be transmitted once a certain amount of signaling (e.g., steps 304-308) has been performed.

In step 310, the target gNB transmits a positioning activation response to the LMF via the AMF by using NRPPa signaling in order to indicate the void or delayed activation information to the LMF.

In step 311, the LMF may transmit, in response to the positioning activation response, a measurement request to the target gNB via the AMF by using NRPPa signaling, wherein the measurement request indicates a conditional request for UL PRS measurements, which may be activated when the target gNB determines and indicates the valid activation time for the UL PRS configuration of the target cell. Alternatively, the measurement request may be transmitted later in response to the target gNB indicating the valid activation time for the UL PRS configuration of the target cell.

In step 312, the UE detects that the UE is entering or about to enter the coverage of the target cell. For example, the UE may measure synchronization signal blocks (SSBs) transmitted from the target gNB in order to detect that the UE is entering or about to enter the coverage of the target cell.

In step 313, upon detecting that the UE is entering or about to enter the target cell (e.g., as determined from SSB measurements), the UE transmits a random-access preamble to the target gNB in order to obtain a valid timing advance for the target cell. The random-access preamble may be transmitted using a small data transmission in RRC_INACTIVE state.

In step 314, the target gNB transmits a random-access response to the UE in response to the random-access preamble received in step 313, wherein the random-access response comprises a timing advance value, based on which the UE may determine the timing advance between uplink and downlink to be applied by the UE for communication with the target gNB. The timing advance of the target cell may be needed to successfully initiate the UL PRS transmission in the target cell. The timing advance value provided in the random-access response may be calculated by the target gNB based on the random-access preamble received from the UE in step 313.

In step 315, the UE transmits an activation request to the target gNB for activating the UL PRS configuration of the target cell (i.e., a request to activate the UL PRS configuration of the target cell), and to obtain a valid activation time for the UL PRS configuration of the target cell. The activation request may be transmitted using a small data transmission in RRC_INACTIVE state. For example, the activation request may be comprised in an RRC resume request message. The UE transmitting the activation request in step 315 may be based on the target cell entry. This may mean, for example, that the UE transmits the activation request upon entering the target cell. In another example, the UE transmits the activation request after entering the target cell. As discussed, the activation request may be transmitted based on the target cell entry; that is, the UE may take the target cell entry into account in determining when to transmit the activation request.

In step 316, the target gNB transmits an activation command to the UE in response to the activation request received in step 315. The activation command may be transmitted while the UE is in the target cell, for example at the edge between the source cell and the target cell. With the activation command, the target gNB may indicate the valid activation time for activating the UL PRS configuration of the target cell. As one example, the valid activation time may be the current time of the target gNB in order to initiate immediate activation of the UL PRS configuration upon receiving the activation command by the UE. The activation command may be comprised in, for example, an RRC release message.

In step 317, the UE activates the UL PRS configuration of the target cell based on the activation command received from the target gNB.

In step 318, the UE transmits, or broadcasts, one or more UL PRS transmissions based on the UL PRS configuration of the target cell and the timing advance value received from the target gNB, while the UE is in the target cell. Step 318 may be performed according to the activated UL PRS configuration (i.e., activated in step 317). For example, this may mean that step 318 is performed in response to activating the UL PRS configuration of the target cell. In other words, upon activating the UL PRS configuration of the target cell, the UE stops transmitting UL PRS based on the UL PRS configuration and timing advance of the source cell, and a new UL PRS transmission is started based on the UL PRS configuration and timing advance of the target cell. The UE may transmit the one or more UL PRS transmission in RRC_INACTIVE state or in RRC_CONNECTED state.

In step 319, thanks to proper uplink synchronization between the UE and the target gNB, the target gNB may successfully decode and measure the one or more UL PRS transmissions transmitted by the UE in step 318.

In step 320, the target gNB transmits a positioning activation response to the LMF via the AMF by using NRPPa signaling in order to indicate the valid activation time to the LMF.

In step 321, the target gNB transmits a measurement response message to the LMF via the AMF by using NRPPa signaling to report the measurements obtained from the one or more UL PRS transmissions in step 319.

The steps and/or blocks described above by means of FIG. 3 are in no absolute chronological order, and some of them may be performed simultaneously or in an order differing from the described one. Other steps and/or blocks may also be executed between them or within them. For example, the measurement request message (step 311) may alternatively be transmitted between steps 320 and 321.

Figure 4:
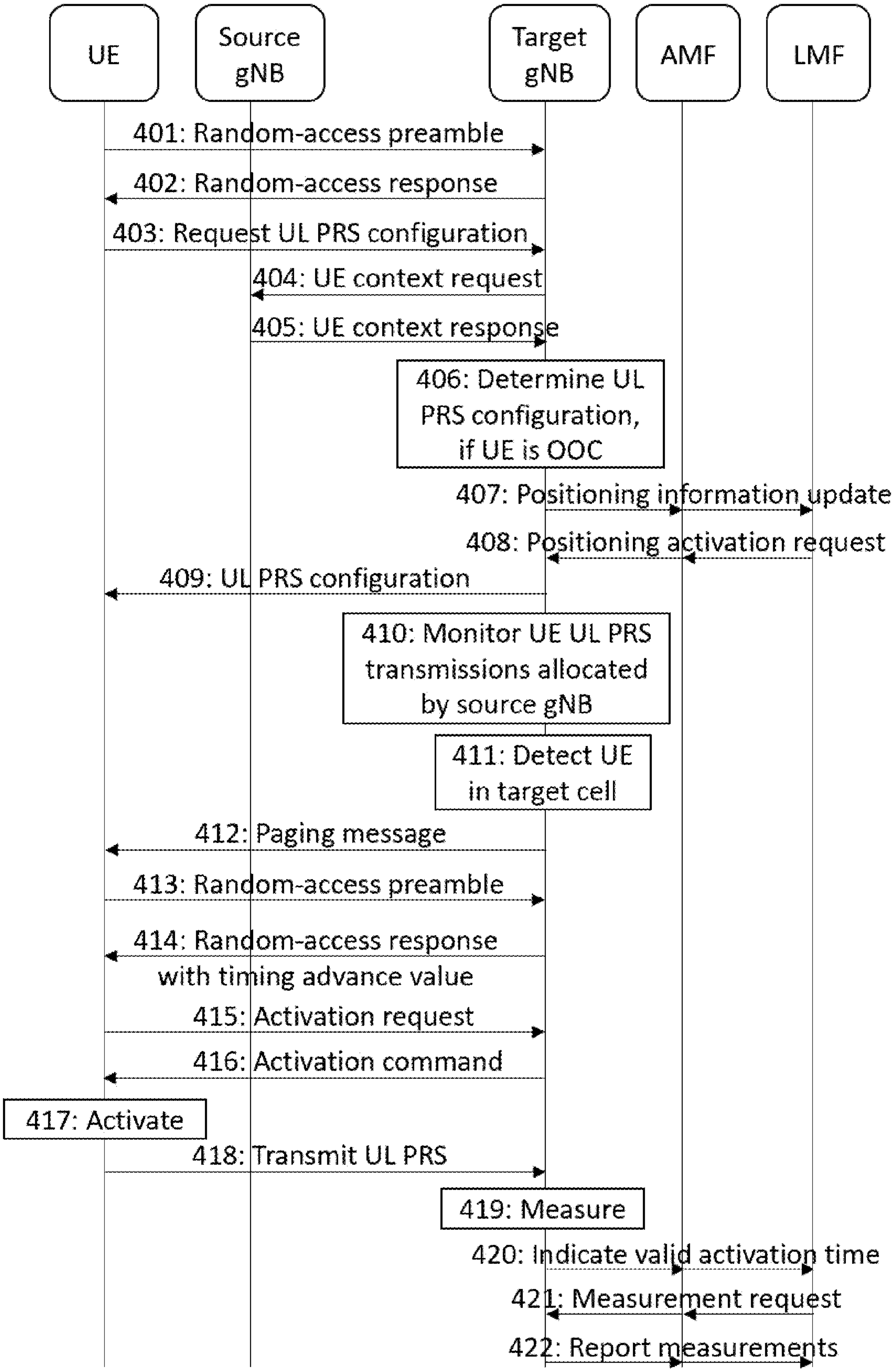

FIG. 4 illustrates a signaling diagram according to an exemplary embodiment for gNB-triggered validation and activation of UL PRS pre-configuration by the target gNB.

Referring to FIG. 4, in step 401, a UE in RRC_INACTIVE state transmits a random-access preamble to the target gNB providing the target cell, while the UE is still in a source cell provided by a source gNB. For example, the UE may correspond to the UE 210 in FIG. 2, the source gNB may correspond to the source gNB 220 in FIG. 2, and the target gNB may correspond to the target gNB 230 in FIG. 2. The random-access preamble may be transmitted using a small data transmission in RRC_INACTIVE state.

In step 402, the target gNB transmits a random-access response to the UE in response to the random-access preamble received in step 301, while the UE is still in the source cell.

In step 403, the UE transmits, to the target gNB, a request message requesting an UL PRS configuration for UL PRS transmission in the target cell. The UE may transmit the request message using a small data transmission in RRC_INACTIVE state, while the UE is still in the source cell. In other words, the UE may not yet be in the target cell, when transmitting the request message. For example, an RRC resume request message may be used as the request message.

In step 404, the target gNB transmits a UE context request to the source gNB (or the last serving cell within the RNA).

In step 405, the source gNB (or the last serving cell within the RNA) transmits a UE context response to the target gNB in response to the UE context request. The UE context response may comprise the UE context and an UL PRS configuration used by the UE in the source cell.

In step 406, the target gNB determines the UL PRS configuration of the target cell for UL PRS transmission by the UE in the target cell, if the target gNB determines that the UE is out of coverage (OOC) of the target cell. For example, the target gNB may determine whether the UE is outside of its coverage by measuring the received uplink signal strength or determining the UE's timing advance during the random-access procedure (steps 401-402), and/or by evaluating the values measured by the source gNB as retrieved from it during the UE context retrieval (steps 404-405). Alternatively or additionally, the coverage information may be explicitly indicated by the UE in the request message in step 403.

In step 407, the target gNB transmits a positioning information update to a location management function (LMF) via an access and mobility management function (AMF) by using the new radio positioning protocol A (NRPPa) signaling in order to register the determined UL PRS configuration of the target cell at the LMF.

In step 408, the LMF transmits, in response to the positioning information update, a positioning activation request to the target gNB via the AMF by using NRPPa signaling to activate the determined UL PRS configuration of the target cell. Having registered the UL PRS configuration at the LMF, the target gNB delays the activation request of the LMF, as this message requires a concrete start time.

In step 409, the target gNB transmits, to the UE, a message indicative of the determined UL PRS configuration of the target cell. The UE may receive the message in RRC_INACTIVE state, while the UE is in the source cell. Alternatively, if the UE is moving very fast, the UE may receive the message after it has already moved to the target cell. For example, an RRC release message may be used as the message indicative of the determined UL PRS configuration of the target cell. In other words, the target gNB completes the initial SDT transaction with the UE by transmitting the message indicative of the determined UL PRS configuration. However, the UL PRS activation information is either void/omitted (i.e., no scheduling grant) or delayed (e.g., Type 1 configured grant via RRC with substantially deferred start time, for example infinite or null start time).

Additionally or alternatively, the message indicative of the UL PRS configuration may further indicate one or more conditions for activating the UL PRS configuration. The UE entering the edge of the target cell may be one of the one or more conditions. In other words, the UE may proactively activate the UL PRS configuration upon arriving at the edge between the source cell and the target cell.

In step 410, the target gNB monitors one or more UL PRS transmissions that the UE is broadcasting as allocated by the source gNB in the UL PRS configuration of the source cell.

In step 411, the target gNB detects, based on the monitoring, that the UE is entering or about to enter the coverage of the target cell. In other words, the presence of the UE in the target cell may be determined by the target gNB based on the monitoring of the UE's UL PRS as allocated by the source cell. The moment when the UE crosses the boundary of the target cell may be determined by comparing the UL PRS strength with radio link monitoring (RLM) measurements collected from RRC_ACTIVE handovers and/or from Automatic Neighbor Relationships.

In step 412, in response to detecting that the UE is entering or about to enter the target cell, the target gNB transmits a paging message to the UE to trigger a random-access/small data transmission procedure, based on which the UL PRS configuration of the target cell is validated and activated.

In step 413, the UE transmits a random-access preamble to the target gNB in response to the paging message in order to obtain a valid timing advance for the target cell. The random-access preamble may be transmitted using a small data transmission in RRC_INACTIVE state.

In step 414, the target gNB transmits a random-access response to the UE in response to the random-access preamble received in step 413, wherein the random-access response comprises a timing advance value, based on which the UE may determine the timing advance between uplink and downlink to be applied by the UE for communication with the target cell. The timing advance of the target cell may be needed to successfully initiate the UL PRS transmission in the target cell. The timing advance value provided in the random-access response may be calculated by the target gNB based on the random-access preamble received from the UE in step 413.

In step 415, in response to the random-access response, the UE transmits an activation request to the target gNB for activating the UL PRS configuration of the target cell (i.e., a request to activate the UL PRS configuration of the target cell), and to obtain a valid activation time for the UL PRS configuration of the target cell. The UE transmitting the activation request in step 415 may be based on the target cell entry. This may mean, for example, that the UE transmits the activation request upon entering the target cell. In another example, the UE transmits the activation request after entering the target cell. As discussed, the activation request may be transmitted based on the target cell entry; that is, the UE may take the target cell entry into account in determining when to transmit the activation request. The activation request may be transmitted using a small data transmission in RRC_INACTIVE state. For example, the activation request may be comprised in an RRC resume request message.

In step 416, the target gNB transmits an activation command to the UE in response to the activation request received in step 415. The activation command may be transmitted while the UE is in the target cell, for example at the edge between the source cell and the target cell. With the activation command, the target gNB may indicate the valid activation time for activating the UL PRS configuration of the target cell. In other words, a usable start time for the UL PRS configuration of the target cell is delivered to the UE upon detecting the presence of the UE in the coverage of the target cell based on the monitoring. The activation command may be comprised in, for example, an RRC release message.

In step 417, the UE activates the UL PRS configuration of the target cell based on the activation command received from the target gNB.

In step 418, the UE transmits, or broadcasts, one or more UL PRS transmissions based on the activated UL PRS configuration of the target cell and the timing advance value received from the target gNB in the random-access response, while the UE is in the target cell. Step 418 may be performed according to the activated UL PRS configuration (i.e., activated in step 417). For example, this may mean that step 418 is performed in response to activating the UL PRS configuration of the target cell. In other words, upon activating the UL PRS configuration of the target cell, the UE stops transmitting UL PRS based on the UL PRS configuration and timing advance of the source cell, and starts a new UL PRS transmission based on the UL PRS configuration and timing advance of the target cell. The UE may transmit the one or more UL PRS transmission in RRC_INACTIVE state or in RRC_CONNECTED state.

In step 419, thanks to proper uplink synchronization between the UE and the target gNB, the target gNB may successfully decode and measure the one or more UL PRS transmissions transmitted by the UE in step 418.

In step 420, the target gNB transmits a positioning activation response to the LMF via the AMF by using NRPPa signaling in order to indicate the valid activation time to the LMF. In other words, the usable start time for the UL PRS configuration of the target cell is delivered to the LMF upon detecting the presence of the UE in the coverage of the target cell based on the monitoring.

In step 421, the LMF transmits a measurement request to the target gNB via the AMF by using NRPPa signaling to request the measurements obtained by the target gNB in step 419.

In step 422, the target gNB transmits, in response to the measurement request, a measurement response message to the LMF via the AMF by using NRPPa signaling to report the measurements obtained from the one or more UL PRS transmissions in step 419.

The steps and/or blocks described above by means of FIG. 4 are in no absolute chronological order, and some of them may be performed simultaneously or in an order differing from the described one. Other steps and/or blocks may also be executed between them or within them.

In another exemplary embodiment, the source gNB (instead of the target gNB) may monitor the quality of the UE's UL PRS as allocated by the source gNB. In other words, step 410 of FIG. 4 may be performed by the source gNB in this exemplary embodiment. When the UE approaches the boundary of the target cell, the source gNB may notify the target gNB to page the UE. Alternatively, the source gNB may trigger the UE to request validation and activation of the UL PRS configuration of the target cell from the target gNB, when the UE approaches the boundary of the target cell. It should be noted that the source gNB and the target gNB know of each other thanks to the context retrieval (steps 404 and 405 of FIG. 4).

In another exemplary embodiment, both the source gNB and the target gNB may collaborate in both measurements and paging.

In another exemplary embodiment, the target gNB may perform blind periodic paging of the UE (or periodic SDT grant and transmission) in order to determine whether it is already necessary to activate the UL PRS configuration of the target cell. Alternatively, an estimated time of arrival of the UE at the target cell may be used to determine when to activate the UL PRS configuration of the target cell. Changes in timing advance measurements, signal strength and/or receive beam may serve as inputs for determining when to activate the UL PRS configuration. Alternatively or additionally, a transmission time indicated by the UE may be used to determine when to activate the UL PRS configuration of the target cell. In other words, the UE may determine the activation time for activating the UL PRS configuration of the target cell based on the UE's own knowledge of its mobility.

The measurements may also be used to cancel the target cell pre-allocation (i.e., the UL PRS configuration of the target cell), for example when the UE changes trajectory and moves towards a different cell. For example, the UE may transmit an SDT message to the target gNB to cancel the UL PRS configuration of the target cell and the UL PRS monitoring performed by the target gNB. Alternatively, the UL PRS configuration of the target cell may expire based on a validity timer associated with it. Alternatively, upon the UE entering another cell, the source gNB may trigger, upon context retrieval from this other cell, cancellation of the UL PRS configuration of the original target cell and the associated monitoring in the original target cell to reduce overhead.

Figure 5:
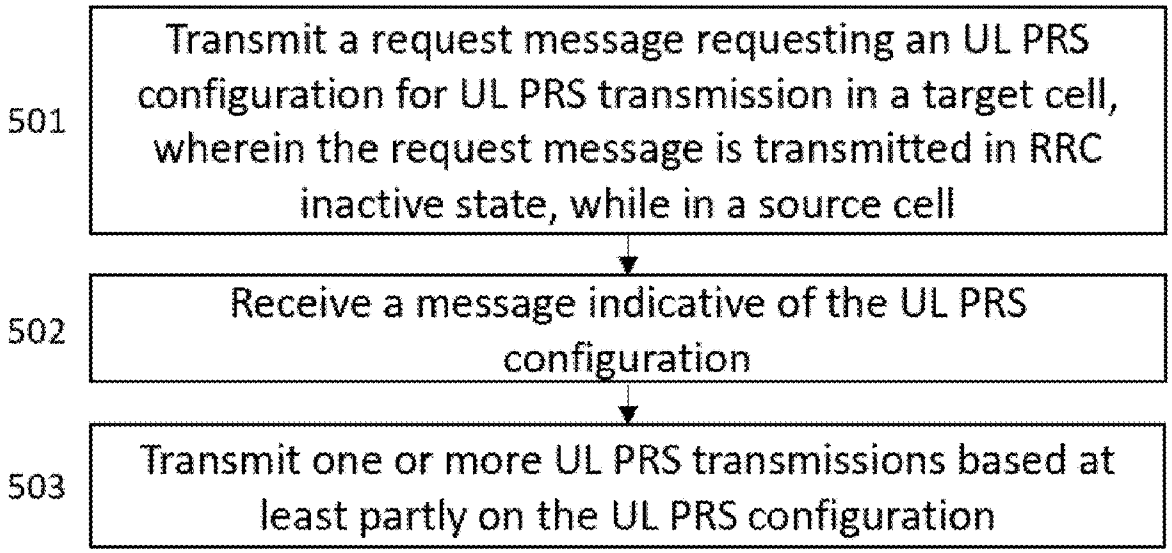
FIGS. 5-6 illustrate flow charts according to some exemplary embodiments.

FIG. 5 illustrates a flow chart according to an exemplary embodiment. The steps illustrated in FIG. 5 may be performed by an apparatus such as, or comprised in, a terminal device. The terminal device may also be referred to as a user device, user equipment, or UE herein.

Referring to FIG. 5, in step 501, the apparatus transmits, to a network node providing a target cell, a request message requesting an UL PRS configuration for UL PRS transmission in the target cell, wherein the request message is transmitted in a radio resource control inactive (RRC_INACTIVE) state, while the apparatus is in a source cell.

In step 502, the apparatus receives, from the network node, a message indicative of the UL PRS configuration.

In step 503, the apparatus transmits one or more UL PRS transmissions based at least partly on the received UL PRS configuration.

Figure 6:
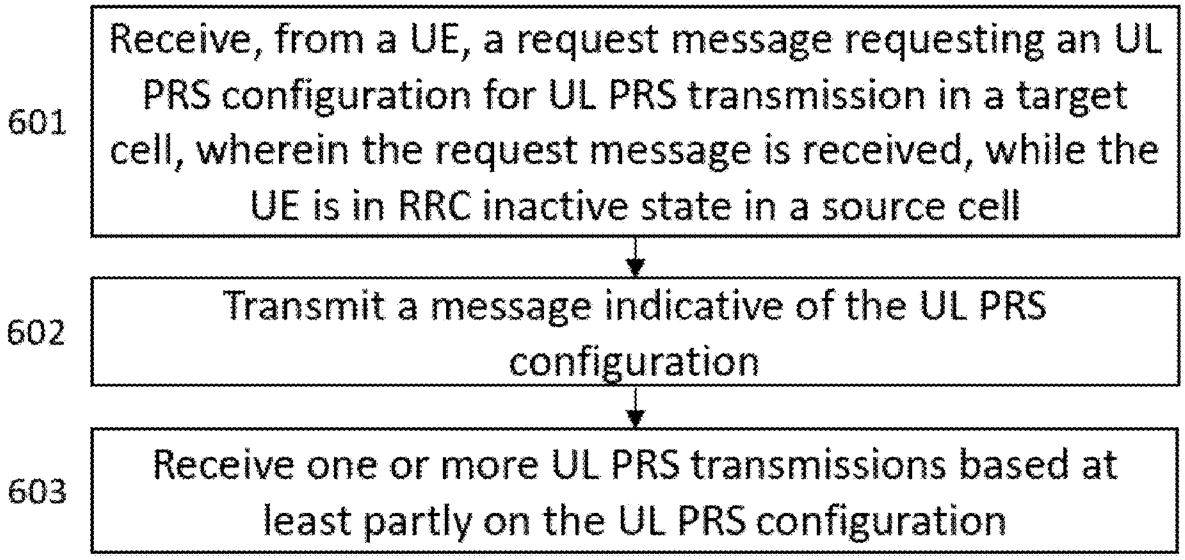

FIG. 6 illustrates a flow chart according to an exemplary embodiment. The steps illustrated in FIG. 6 may be performed by an apparatus such as, or comprised in, a network node of a wireless communication network. The network node may also be referred to as a target gNB herein.

Referring to FIG. 6, in step 601, the apparatus receives, from a terminal device, a request message requesting an UL PRS configuration for UL PRS transmission in a target cell provided by the apparatus, wherein the request message is received while the terminal device is in a radio resource control inactive (RRC_INACTIVE) state in a source cell.

In step 602, the apparatus transmits, to the terminal device, a message indicative of the uplink positioning reference signal configuration.

In step 603, the apparatus receives, from the terminal device, one or more UL PRS transmissions based at least partly on the transmitted UL PRS configuration.

The steps and/or blocks described above by means of FIGS. 5-6 are in no absolute chronological order, and some of them may be performed simultaneously or in an order differing from the described one. Other steps and/or blocks may also be executed between them or within them.

A technical advantage provided by some exemplary embodiments is that they may enable efficient low-latency UL PRS configuration and activation/deactivation in mobile RRC_INACTIVE UEs for UE positioning purposes. Some exemplary embodiments may reduce UE power consumption and configuration delay, which may otherwise disrupt the positioning operation and/or performance. Furthermore, some exemplary embodiments may ensure timely and efficient resource allocation at the gNB, on which the UE is camping, without conflict with the neighboring gNBs.

Figure 7:
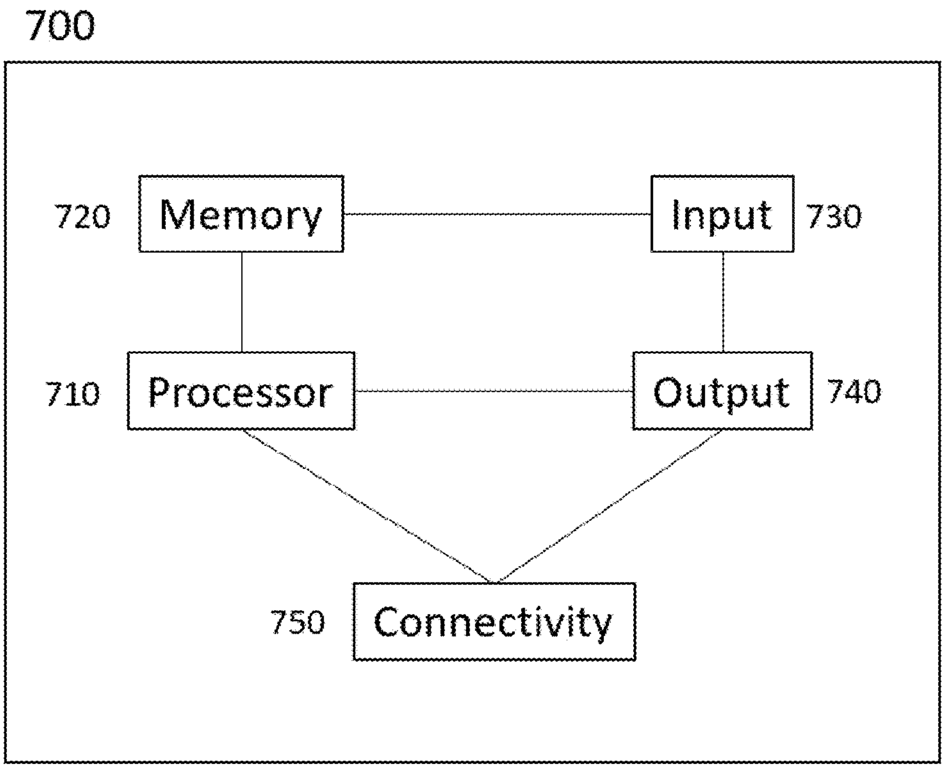
FIGS. 7-8 illustrate apparatuses according to some exemplary embodiments.

FIG. 7 illustrates an apparatus 700, which may be an apparatus such as, or comprised in, a terminal device, according to an exemplary embodiment. The terminal device may also be referred to as a UE or user equipment herein. The apparatus 700 comprises a processor 710. The processor 710 interprets computer program instructions and processes data. The processor 710 may comprise one or more programmable processors. The processor 710 may comprise programmable hardware with embedded firmware and may, alternatively or additionally, comprise one or more application-specific integrated circuits (ASICs).

The processor 710 is coupled to a memory 720. The processor is configured to read and write data to and from the memory 720. The memory 720 may comprise one or more memory units. The memory units may be volatile or non-volatile. It is to be noted that in some exemplary embodiments there may be one or more units of non-volatile memory and one or more units of volatile memory or, alternatively, one or more units of non-volatile memory, or, alternatively, one or more units of volatile memory. Volatile memory may be for example random-access memory (RAM), dynamic random-access memory (DRAM) or synchronous dynamic random-access memory (SDRAM). Non-volatile memory may be for example read-only memory (ROM), programmable read-only memory (PROM), electronically erasable programmable read-only memory (EEPROM), flash memory, optical storage or magnetic storage. In general, memories may be referred to as non-transitory computer readable media. The memory 720 stores computer readable instructions that are executed by the processor 710. For example, non-volatile memory stores the computer readable instructions and the processor 710 executes the instructions using volatile memory for temporary storage of data and/or instructions.

The computer readable instructions may have been prestored to the memory 720 or, alternatively or additionally, they may be received, by the apparatus, via an electromagnetic carrier signal and/or may be copied from a physical entity such as a computer program product. Execution of the computer readable instructions causes the apparatus 700 to perform one or more of the functionalities described above.

In the context of this document, a "memory" or "computer-readable media" or "computer-readable medium" may be any non-transitory media or medium or means that can contain, store, communicate, propagate or transport the instructions for use by or in connection with an instruction execution system, apparatus, or device, such as a computer.

The apparatus 700 may further comprise, or be connected to, an input unit 730. The input unit 730 may comprise one or more interfaces for receiving input. The one or more interfaces may comprise for example one or more temperature, motion and/or orientation sensors, one or more cameras, one or more accelerometers, one or more microphones, one or more buttons and/or one or more touch detection units. Further, the input unit 730 may comprise an interface to which external devices may connect to.

The apparatus 700 may also comprise an output unit 740. The output unit may comprise or be connected to one or more displays capable of rendering visual content, such as a light emitting diode (LED) display, a liquid crystal display (LCD) and/or a liquid crystal on silicon (LCOS) display. The output unit 740 may further comprise one or more audio outputs. The one or more audio outputs may be for example loudspeakers.

The apparatus 700 further comprises a connectivity unit 750. The connectivity unit 750 enables wireless connectivity to one or more external devices. The connectivity unit 750 comprises at least one transmitter and at least one receiver that may be integrated to the apparatus 700 or that the apparatus 700 may be connected to. The at least one transmitter comprises at least one transmission antenna, and the at least one receiver comprises at least one receiving antenna. The connectivity unit 750 may comprise an integrated circuit or a set of integrated circuits that provide the wireless communication capability for the apparatus 700. Alternatively, the wireless connectivity may be a hardwired application-specific integrated circuit (ASIC). The connectivity unit 750 may comprise one or more components such as a power amplifier, digital front end (DFE), analog-to-digital converter (ADC), digital-to-analog converter (DAC), frequency converter, (de)modulator, and/or encoder/decoder circuitries, controlled by the corresponding controlling units.

It is to be noted that the apparatus 700 may further comprise various components not illustrated in FIG. 7. The various components may be hardware components and/or software components.

Figure 8:
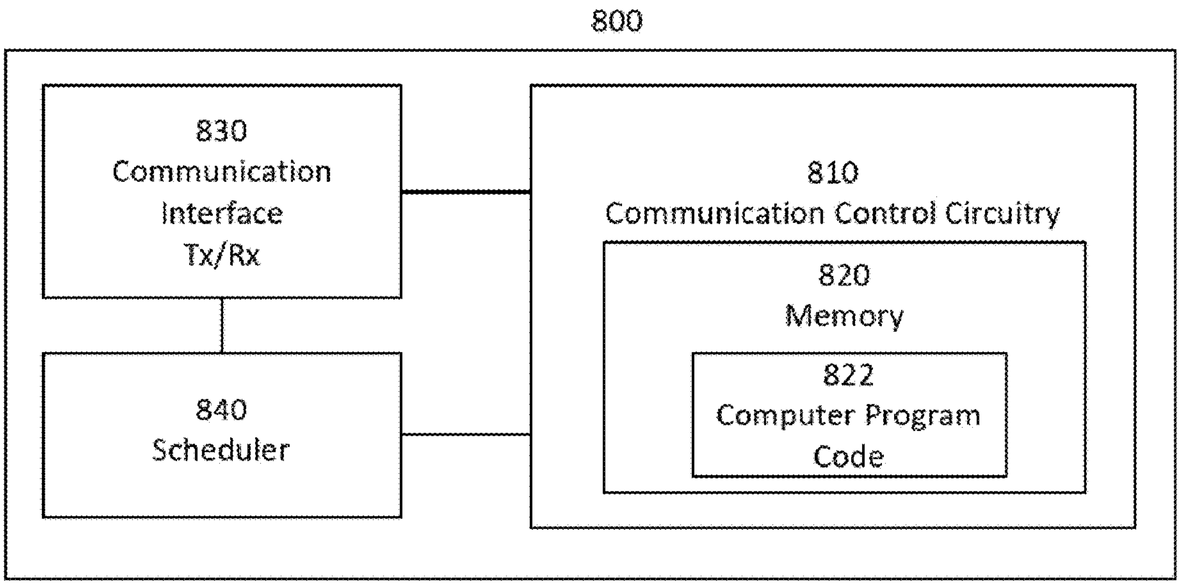

The apparatus 800 of FIG. 8 illustrates an exemplary embodiment of an apparatus such as, or comprised in, a network node of a wireless communication network. The network node may also be referred to, for example, as a RAN node, an integrated access and backhaul (IAB) node, an IAB donor node, a NodeB, an LTE evolved NodeB (eNB), a gNB, a target gNB, a source gNB, a base station, an NR base station, a 5G base station, an access node, an access point (AP), a distributed unit (DU), a central unit (CU), a baseband unit (BBU), a radio unit (RU), a radio head, a remote radio head (RRH), or a transmission and reception point (TRP).

The apparatus 800 may comprise, for example, a circuitry or a chipset applicable for realizing some of the described exemplary embodiments. The apparatus 800 may be an electronic device comprising one or more electronic circuitries. The apparatus 800 may comprise a communication control circuitry 810 such as at least one processor, and at least one memory 820 including a computer program code (software) 822 wherein the at least one memory and the computer program code (software) 822 are configured, with the at least one processor, to cause the apparatus 800 to carry out some of the exemplary embodiments described above. Computer program code herein may refer to instructions that cause performance of said apparatus. That is, the at least one processor and the at least one memory 820 storing the instructions may cause said performance of the apparatus.

The processor is coupled to the memory 820. The processor is configured to read and write data to and from the memory 820. The memory 820 may comprise one or more memory units. The memory units may be volatile or non-volatile. It is to be noted that in some exemplary embodiments there may be one or more units of non-volatile memory and one or more units of volatile memory or, alternatively, one or more units of non-volatile memory, or, alternatively, one or more units of volatile memory. Volatile memory may be for example random-access memory (RAM), dynamic random-access memory (DRAM) or synchronous dynamic random-access memory (SDRAM). Non-volatile memory may be for example read-only memory (ROM), programmable read-only memory (PROM), electronically erasable programmable read-only memory (EEPROM), flash memory, optical storage or magnetic storage. In general, memories may be referred to as non-transitory computer readable media. The memory 820 stores computer readable instructions that are executed by the processor. For example, non-volatile memory stores the computer readable instructions and the processor executes the instructions using volatile memory for temporary storage of data and/or instructions.

The computer readable instructions may have been pre-stored to the memory 820 or, alternatively or additionally, they may be received, by the apparatus, via an electromagnetic carrier signal and/or may be copied from a physical entity such as a computer program product. Execution of the computer readable instructions causes the apparatus 800 to perform one or more of the functionalities described above.

The memory 820 may be implemented using any suitable data storage technology, such as semiconductor-based memory devices, flash memory, magnetic memory devices and systems, optical memory devices and systems, fixed memory and/or removable memory. The memory may comprise a configuration database for storing configuration data. For example, the configuration database may store a current neighbour cell list, and, in some exemplary embodiments, structures of the frames used in the detected neighbour cells.

The apparatus 800 may further comprise a communication interface 830 comprising hardware and/or software for realizing communication connectivity according to one or more communication protocols. The communication interface 830 comprises at least one transmitter (Tx) and at least one receiver (Rx) that may be integrated to the apparatus 800 or that the apparatus 800 may be connected to. The communication interface 830 provides the apparatus with radio communication capabilities to communicate in the cellular communication system. The communication interface may, for example, provide a radio interface to terminal devices. The apparatus 800 may further comprise another interface towards a core network such as the network coordinator apparatus and/or to the access nodes of the cellular communication system. The apparatus 800 may further comprise a scheduler 840 that is configured to allocate resources. The scheduler 840 may be configured along with the communication control circuitry 810 or it may be separately configured.

As used in this application, the term "circuitry" may refer to one or more or all of the following: a) hardware-only circuit implementations (such as implementations in only analog and/or digital circuitry); and b) combinations of hardware circuits and software, such as (as applicable): i) a combination of analog and/or digital hardware circuit(s) with software/firmware and ii) any portions of hardware processor(s) with software (including digital signal processor(s)), software, and memory(ies) that work together to cause an apparatus, such as a mobile phone, to perform various functions); and c) hardware circuit(s) and/or processor(s), such as a microprocessor(s) or a portion of a microprocessor(s), that requires software (for example firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

The techniques and methods described herein may be implemented by various means. For example, these techniques may be implemented in hardware (one or more devices), firmware (one or more devices), software (one or more modules), or combinations thereof. For a hardware implementation, the apparatus(es) of exemplary embodiments may be implemented within one or more application-specific integrated circuits (ASICs), digital signal processors (DSPs), digital signal processing devices (DSPDs), programmable logic devices (PLDs), field programmable gate arrays (FPGAs), graphics processing units (GPUs), processors, controllers, micro-controllers, microprocessors, other electronic units designed to perform the functions described herein, or a combination thereof. For firmware or software, the implementation can be carried out through modules of at least one chipset (for example procedures, functions, and so on) that perform the functions described herein. The software codes may be stored in a memory unit and executed by processors. The memory unit may be implemented within the processor or externally to the processor. In the latter case, it can be communicatively coupled to the processor via various means, as is known in the art. Additionally, the components of the systems described herein may be rearranged and/or complemented by additional components in order to facilitate the achievements of the various aspects, etc., described with regard thereto, and they are not limited to the precise configurations set forth in the given figures, as will be appreciated by one skilled in the art.

It will be obvious to a person skilled in the art that, as technology advances, the inventive concept may be implemented in various ways. The embodiments are not limited to the exemplary embodiments described above, but may vary within the scope of the claims. Therefore, all words and expressions should be interpreted broadly, and they are intended to illustrate, not to restrict, the exemplary embodiments.

The invention claimed is:

1. An apparatus comprising at least one processor, and at least one memory including computer program code, wherein the at least one memory and the computer program code are configured, with the at least one processor, to cause the apparatus to:

transmit a random-access preamble to a network node providing a target cell while the apparatus is still in a source cell;

receive, from the network node, a random-access response in response to the random-access preamble while the apparatus is still in the source cell, the random-access response comprises a timing advance value, wherein only the target cell can issue the timing advance value for the apparatus;

based on the timing advance value, determine a timing advance between uplink and downlink to be applied by the apparatus for communication with the target cell:

transmit, to the network node, a request message requesting an uplink positioning reference signal configuration for uplink positioning reference signal transmission in the target cell, wherein the request message is transmitted in a radio resource control inactive state, while the apparatus is in a source cell;

receive, from the network node, a message indicative of the uplink positioning reference signal configuration, wherein the message indicative of the uplink positioning reference signal configuration is received while that apparatus is in the source cell;

transmit, to the network node, an activation request for activating the uplink positioning reference signal configuration, wherein the activation request is transmitted based on target cell entry;

receive, from the network node, an activation command while in the target cell and while at an edge area between the source cell and the target cell:

activate the uplink positioning reference signal configuration based on the activation command from the network node; and based on the activated uplink positioning reference signal configuration, transmit one or more uplink positioning reference signal transmissions based at least partly on the uplink positioning reference signal configuration.

2. The apparatus according to claim 1, wherein the request message is transmitted using a small data transmission.

3. The apparatus according to claim 2, wherein the message indicative of the uplink positioning reference signal configuration further indicates delayed activation of the uplink positioning reference signal configuration.

4. The apparatus according to claim 3, wherein transmitting the activation request is triggered based on the apparatus entering the target cell.

5. The apparatus according to claim 4, wherein the one or more uplink positioning reference signal transmissions are transmitted in the radio resource control inactive state.

6. The apparatus according to claim 4, wherein the one or more uplink positioning reference signal transmissions are transmitted in a radio resource control active state.

7. The apparatus according to claim 6, wherein the apparatus is a user equipment.

8. A system comprising:

an apparatus;

at least one processor; and at least one memory including computer program code, wherein the at least one memory and the computer program code are configured, with the at least one processor, to cause the apparatus to:

transmit a random-access preamble to a network node providing a target cell while the apparatus is still in a source cell;

receive, from the network node, a random-access response in response to the random-access preamble while the apparatus is still in the source cell, the random-access response comprises a timing advance value, wherein only the target cell can issue the timing advance value for the apparatus;

based on the timing advance value, determine a timing advance between uplink and downlink to be applied by the apparatus for communication with the target cell;

transmit, to the network node providing a target cell, a request message requesting an uplink positioning reference signal configuration for uplink positioning reference signal transmission in the target cell, wherein the request message is transmitted in a radio resource control inactive state, while the apparatus is in a source cell;

receive, from the network node, a message indicative of the uplink positioning reference signal configuration, wherein the message indicative of the uplink positioning reference signal configuration is received while that apparatus is in the source cell;

transmit, to the network node, an activation request for activating the uplink positioning reference signal configuration, wherein the activation request is transmitted based on target cell entry;

receive, from the network node, an activation command while in the target cell and while at an edge area between the source cell and the target cell;

activate the uplink positioning reference signal configuration based on the activation command from the network node; and based on the activated uplink positioning reference signal configuration, transmit one or more uplink positioning reference signal transmissions based at least partly on the uplink positioning reference signal configuration.

9. The system according to claim 8, wherein the request message is transmitted using a small data transmission.

10. The system according to claim 9, wherein the message indicative of the uplink positioning reference signal configuration further indicates delayed activation of the uplink positioning reference signal configuration.

11. The system according to claim 10, wherein transmitting the activation request is triggered based on the apparatus entering the target cell.

12. The system according to claim 11, wherein the one or more uplink positioning reference signal transmissions are transmitted in the radio resource control inactive state.

13. The system according to claim 11, wherein the one or more uplink positioning reference signal transmissions are transmitted in a radio resource control active state.

14. The system according to claim 13, wherein the apparatus is a user equipment.

15. The system according to claim 8, wherein the one or more uplink positioning reference signal transmissions are transmitted in a radio resource control active state.

16. A method comprising:

transmitting, by a user equipment, a random-access preamble to a network node providing a target cell while the apparatus is still in a source cell;

receiving, from the network node, a random-access response in response to the random-access preamble while the apparatus is still in the source cell, the random-access response comprises a timing advance value, wherein only the target cell can issue the timing advance value for the apparatus;

based on the timing advance value, determining a timing advance between uplink and downlink to be applied by the apparatus for communication with the target cell;

transmitting, to the network node providing a target cell, a request message requesting an uplink positioning reference signal configuration for uplink positioning reference signal transmission in the target cell, wherein the request message is transmitted in a radio resource control inactive state, while the apparatus is in a source cell;

receiving, from the network node, a message indicative of the uplink positioning reference signal configuration, wherein the message indicative of the uplink positioning reference signal configuration is received while that apparatus is in the source cell;

transmit, to the network node, an activation request for activating the uplink positioning reference signal configuration, wherein the activation request is transmitted based on target cell entry;

receiving, from the network node, an activation command while in the target cell and while at an edge area between the source cell and the target cell;

activating the uplink positioning reference signal configuration based on the activation command from the network node; and based on the activated uplink positioning reference signal configuration, transmitting one or more uplink positioning reference signal transmissions based at least partly on the uplink positioning reference signal configuration.

17. The method according to claim 16, wherein the request message is transmitted using a small data transmission.

18. The system according to claim 17, wherein the message indicative of the uplink positioning reference signal configuration further indicates delayed activation of the uplink positioning reference signal configuration.

19. The system according to claim 18, wherein transmitting the activation request is triggered based on the apparatus entering the target cell.

20. The system according to claim 19, wherein the one or more uplink positioning reference signal transmissions are transmitted in the radio resource control inactive state.

* * * * *